United States Patent
Chambriard et al.

(10) Patent No.: US 8,955,569 B2
(45) Date of Patent: Feb. 17, 2015

(54) CARCASS REINFORCEMENT FOR AIRPLANE TIRE

(75) Inventors: François Chambriard, Beaumont (FR); Jean Luc Dendievel, Coumon d'Auvergne (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 733 days.

(21) Appl. No.: 12/864,400

(22) PCT Filed: Jan. 14, 2009

(86) PCT No.: PCT/EP2009/050332
§ 371 (c)(1),
(2), (4) Date: Oct. 13, 2010

(87) PCT Pub. No.: WO2009/092648
PCT Pub. Date: Jul. 30, 2009

(65) Prior Publication Data
US 2011/0017379 A1  Jan. 27, 2011

(30) Foreign Application Priority Data
Jan. 24, 2008 (FR) .................................. 08 50429

(51) Int. Cl.
*B60C 15/06* (2006.01)
*B60C 15/00* (2006.01)
(52) U.S. Cl.
CPC ......... *B60C 15/0072* (2013.04); *B60C 15/0009* (2013.04); *B60C 15/0603* (2013.04);
(Continued)

(58) Field of Classification Search
CPC ............ B60C 15/0009; B60C 15/0072; B60C 15/0603; B60C 15/0607; B60C 2015/009; B60C 2015/061; B60C 2015/0621; B60C 2015/0625
USPC .......................... 152/552–554, 541, 546, 547
See application file for complete search history.

(56) References Cited

U.S. PATENT DOCUMENTS 4,029,137 A * 6/1977 Suydam
4,887,655 A   12/1989 Imai et al.
(Continued)

FOREIGN PATENT DOCUMENTS

EP  0 599 575  6/1994
EP  0 756 950  2/1997
(Continued)

OTHER PUBLICATIONS

English machine translation of JP 2008-222053 A, Sep. 25, 2008.*
(Continued)

*Primary Examiner* — Adrienne C Johnstone
(74) *Attorney, Agent, or Firm* — Cozen O'Connor (57) ABSTRACT

An airplane tire has a carcass reinforcement that comprises at least two inner layers wrapped around the bead core from the inside to the outside of the tire to form respectively a turn-up, and at least one outer layer wrapped around the bead core from the outside to the inside of the tire, and axially outward, within the sidewall, of any inner layer. One of the at least two inner layers that is axially nearest the bead core is decoupled for at least a part of its length, in an area adjacent to and radially outward of the bead core, from the turn-ups and carcass reinforcement layers which are axially outward of it, by at least one polymeric bead filler compound.

9 Claims, 5 Drawing Sheets (52) U.S. Cl.
CPC ............. B60C15/0607 (2013.04); B60C 15/06 (2013.01); B60C 2015/009 (2013.04); B60C 2015/061 (2013.04); B60C 2015/0621 (2013.04); B60C 2015/0625 (2013.04); B60C 2200/02 (2013.04)
USPC ........... 152/541; 152/546; 152/547; 152/552; 152/553; 152/554

(56) References Cited

U.S. PATENT DOCUMENTS

| | | | | |
|---|---|---|---|---|
| 4,962,803 A | * | 10/1990 | Welter | 152/541 |
| 5,085,260 A | | 2/1992 | Ueyoko et al. | |
| 6,408,914 B1 | * | 6/2002 | Lamock et al. | 152/546 X |
| 6,736,177 B2 | * | 5/2004 | Ueyoko | 152/541 X |

FOREIGN PATENT DOCUMENTS

| | | | | |
|---|---|---|---|---|
| EP | 1 238 828 | | | 9/2002 |
| EP | 1 808 313 | | | 7/2007 |
| JP | 61071206 | A | * | 4/1986 |
| JP | 01215606 | A | * | 8/1989 |
| JP | 2008222053 | A | * | 9/2008 |
| WO | WO 02/085646 | | | 10/2002 |

OTHER PUBLICATIONS

Mechanics of Pneumatic Tires, ed. Samuel Clark, US Department of Transportation, Aug. 1981, pp. 212-213.*

* cited by examiner

CARCASS REINFORCEMENT FOR AIRPLANE TIRE

RELATED APPLICATIONS

This is a U.S. national stage of application No. PCT/EP2009/050332, filed on Jan. 14, 2009.

This patent application claims the priority of French patent application Ser. No. 08/50429 filed Jan. 24, 2008, the disclosure content of which is hereby incorporated by reference.

FIELD OF THE INVENTION

The present invention relates to an airplane tire with an inflation pressure greater than 9 bar and a deflection greater than 30%, the usage of which is characterized by high pressure, high load and high speed conditions.

BACKGROUND OF THE INVENTION

The deflection of a tire is, by definition, its radial deformation, or its variation of radial height, as it passes from an unloaded inflated state to a statically loaded inflated state, under nominal conditions of pressure and load. It is expressed in the form of a relative deflection, defined as the ratio of this variation of the radial height of the tire to half the difference between the outside diameter of the tire and the maximum diameter of the rim measured on the rim flange. The outside diameter of the tire is measured statically in an inflated unloaded state at nominal pressure.

Although not limited to this use, the invention is more particularly described in respect of a tire with a radial carcass reinforcement, used on an airliner, and having a nominal inflation pressure of 17 bar, a nominal static load of 34 tonnes and a maximum speed of 380 km/h.

In the text below, the following expressions are given the meanings indicated:

"Radial plane": a plane containing the axis of rotation of the tire.

"Equatorial plane": the plane perpendicular to the axis of rotation of the tire, passing through the middle of the tire tread.

"Radial direction": a direction perpendicular to the axis of rotation of the tire.

"Axial direction": a direction parallel to the axis of rotation of the tire.

"Component X radially inward/outward of Component Y": the radial distance of component X from the axis of rotation of the tire is less than/greater than, respectively, the radial distance of component Y from the axis of rotation of the tire.

"Component X axially inward/outward of Component Y": the axial distance of Component X from the equatorial plane of the tire is less than/greater than, respectively, the axial distance of Component Y from the equatorial plane of the tire.

"Inside of the tire": the inside of the cavity of the tire on which the inflation pressure acts.

The architecture of such an airplane tire is described for example in patent EP 1 381 525.

Such a tire comprises a tread designed to come into contact with the ground and connected by two sidewalls to two beads, each bead providing the connection between the tire and a wheel rim.

The tire also comprises a reinforcing structure consisting of a crown reinforcement radially inward of the tread, and a radial carcass reinforcement radially inward of the crown reinforcement.

The radial carcass reinforcement of an airplane tire usually contains a plurality of layers of reinforcing elements which are parallel with each other and form, with the circumferential direction, an angle of between 85° and 95°. The layers of reinforcing elements of the carcass reinforcement, which are termed the carcass reinforcement layers, are anchored, in each bead, to at least one circumferential reinforcing element or bead core. The carcass reinforcement layers usually comprise at least one so-called inner layer, which is wrapped around the bead core in a direction proceeding from the inside to the outside of the tire to form a turn-up that terminates at an end, and at least one so-called outer layer, which is wrapped around the bead core in a direction proceeding from the outside to the inside of the tire and axially outward of all the inner layers and their respective turn-ups, within the sidewall.

The reinforcing elements of carcass reinforcement layers, for airplane tires, are usually cords made of threads of textile filaments, preferably aliphatic polyamides or aromatic polyamides.

The mechanical properties in extension of textile reinforcing elements (modulus, elongation and force at break) are measured after prior conditioning. "Prior conditioning" means that the reinforcing textile elements are stored for at least 24 hours, before being measured, in a standard atmosphere according to European Standard DIN EN 20139 (temperature de 20±2° C.; hygrometry 65±2%). Measurements are made in a known manner using a ZWICK GmbH & Co (Germany) type 1435 or type 1445 traction machine. The textile reinforcing elements are pulled on an initial length of 400 mm at a nominal speed of 200 mm/min. All results are averaged over 10 readings.

The inner layer axially nearest the bead core is normally separated from the turn-ups and outer layers, which are axially outward of it, by at least one polymeric bead filler compound which is adjacent to and radially outward of the bead core.

Regarding the polymeric bead filler compound, the "modulus of elasticity" means a secant modulus of extension at 10% deformation and at room temperature. The modulus measurements are performed in traction according to Standard AFNOR-NFT-46002, September 1988: the measurement is performed on the second elongation (i.e. after an accommodation cycle) to give the nominal secant modulus (or apparent stress, in MPa) at 10% elongation (normal temperature and hygrometry conditions according to Standard AFNOR-NFT-40101, December 1979).

The radially outermost point of the polymeric bead filler compound, beyond which in the radial direction the carcass reinforcement layers are each coupled to their neighbour, is called the coupling point.

For the purposes of the invention, the coupling between two adjacent carcass reinforcement layers is characterized by a distance between their respective neutral fibres less than or equal to twice the diameter of the cross section of a reinforcing element forming part of the carcass reinforcement layers.

The location of the ends of the turn-ups and the coupling of the turn-ups to each other and to the adjacent carcass reinforcement layers, radially outward of the coupling point, ensures the anchoring of the turn-ups under the very severe load, pressure and speed conditions of such a tire.

In use, the mechanical rolling stresses cause cyclical flexing of the tire, which rolls up and down on the rim flanges.

In the following text, the expression "rim flexing area" denotes the part of the tire whose outer boundary rolls up and down on the rim flange, adopting its geometry in the contact area under the combined action of pressure and load.

The cyclical flexing generates, in the polymeric materials of the rim flexing area, and especially in those immediately adjacent to the turn-up ends, stresses and deformations which may in time degrade the tire and necessitate its replacement.

The cyclical flexing also generates, in the parts of the carcass reinforcement layers situated in the rim flexing area, variations of curvature combined with variations of tension. These variations of tension, particularly in the axially outermost layers, can be minimal, corresponding to compression which can cause failure of the material of the reinforcing elements of the layers and therefore deterioration of the tire.

Patent EP 0 599 575 has already described, in the case of a carcass reinforcement consisting of a plurality of layers of reinforcing elements, a way of preventing the risk of failure of the carcass reinforcement layers by locating the turn-up ends away from the rim flexing area. The rim flexing area, in the context of the patent cited above, is bounded by two straight lines perpendicular to the inner layers which are wrapped from the inside to the outside. The first straight line passes through the axially outermost point of contact, between the tire inflated at nominal pressure and unloaded, and the rim flange. The second straight line passes through the axially outermost point of contact, between the tire, inflated at nominal pressure and loaded to twice its nominal static load, and the rim flange. The turn-up ends are located either radially outward of the radially outermost straight line, or radially inward of the radially innermost straight line. The turn-up ends located radially outward of the radially outermost straight line create a relatively large bead thickness, in the rim flexing area, which is disadvantageous in terms of material costs. The turn-up ends positioned radially inward of the radially innermost straight line create a risk of premature deterioration of the tire by separation of the inner layers.

Patent EP 1 238 828 has also disclosed a solution for preventing the risk of failure of the carcass reinforcement layers, by reducing the number of turn-ups in the rim flexing area. This solution consists in having at least one inner layer with no turn-up, i.e. its end is positioned radially inward of the radially innermost point of the bead core. Under severe conditions of load, pressure and speed, the absence of turn-up can increase the risk of separation of the corresponding inner layer and therefore of the tire.

SUMMARY OF THE INVENTION

One object of the invention is to improve the resistance to failure of the carcass reinforcement layers of an airplane tire in the rim flexing area, for severe conditions of load, pressure and speed, while minimizing material costs.

This objective has been achieved, according to an aspect of the invention, with an airplane tire, having an inflation pressure greater than 9 bar and a deflection greater than 30%, comprising a tread connected by two sidewalls to two beads, the two beads providing a connection between the tire and a wheel rim, and each of the two beads comprising at least one bead core, and a carcass reinforcement comprising at least two inner layers wrapped around the bead core in a direction proceeding from the inside to the outside of the tire to form respectively a turn-up terminating at an end, and at least one outer layer wrapped around the bead core in a direction proceeding from the outside to the inside of the tire, and axially outward, within the sidewall, of any inner layer, and the inner layer that is axially nearest the bead core being decoupled for at least part of its length and in the area adjacent to and radially outward of the bead core, from the turn-ups and carcass reinforcement layers which are axially outward of it, by at least one polymeric bead filler compound, whose radially outermost point is termed the coupling point, at least one turn-up of one of the at least two inner layers having an end radially outward of the coupling point and being decoupled, for at least part of its length and on both of its faces, to adjacent carcass reinforcement layers, the end of at least one turn-up being radially inward of the coupling point, and at least one turn-up, whose end is radially inward of the coupling point, being decoupled for at least part of its length and on at least its axially outward face from any other carcass reinforcement layer or from any other turn-up by at least one polymeric bead filler compound.

Investigation of a tire according to an embodiment of the invention has shown that, under the action of the cyclical stresses acting on the tire, the outer layers suffer less deterioration or even no deterioration when compared with those of a tire as disclosed in Patent EP 1 381 525. The inventors believe that this result can be interpreted as being due to locating the end of at least one turn-up radially inward of the coupling point. The elimination of at least one turn-up in the rim flexing area, which reduces the thickness of said area, decreases the compression applied to the axially outermost outer layers, and therefore reduces the risk of local failure of the reinforcing elements of said outer layers. The advantage of a saving of material and therefore a reduction of cost is also noted.

In addition, the inventors believe that the decoupling of at least one turn-up from any other layer at least on its axially outward-facing face and for at least part of its length contributes to efficient anchoring of this turn-up, the reason being that this decoupling appears to limit the separation of the corresponding inner layer by introducing mechanical immobilization of the turn-up by the polymeric bead filler compound, in contrast to more common approaches in which the turn-up is coupled to the adjacent carcass reinforcement layers as a means of anchoring the turn-up.

A first embodiment of the invention, in the case of a carcass reinforcement comprising at least two inner layers, is to have at least one turn-up, whose end is radially outward of the coupling point, coupled, for at least part of its length and on both of its faces, to the adjacent carcass reinforcement layers. This turn-up, whose end is radially outward of the coupling point, is thus anchored, for at least part of its length and on both of its faces, by being coupled to the adjacent carcass reinforcement layers.

A second, preferred embodiment of the invention is to locate the ends of all the turn-ups radially inward of the coupling point. This approach further reduces the number of layers in the rim flexing area, and therefore the thickness of the tire in this area, and consequently reduces the compression acting on the outer layers which causes tire deterioration.

In a variant of any one of the preceding embodiments, it is advantageous to have at least one turn-up, whose end is radially inward of the coupling point, coupled, for at least part of its length and on at least one face, to at least one carcass reinforcement layer or to at least one turn-up. This anchoring by coupling of at least one turn-up improves the anchorage of the carcass reinforcement by supplementing the anchorage with the mechanical immobilization described earlier. In the case of a single inner layer, the single turn-up is thus coupled for part of its length and decoupled for another part of its length. In the case of at least two inner layers, at least one turn-up is coupled and at least one turn-up is decoupled.

In another variant of the invention, it is advantageous to have all the turn-ups, whose ends are radially inward of the coupling point, decoupled, for at least part of their length and on both of their faces, from any other carcass reinforcement layer and from any other turn-up. The anchorage of each turn-up is provided by its mechanical immobilization by at least one polymeric bead filler compound.

Advantageously again, according to an embodiment of the invention, at least one turn-up, whose end is radially inward of the coupling point, is coupled to at least one carcass reinforcement layer or turn-up, on at least one face and for a distance greater than or equal to ten times the diameter of a reinforcing element of a carcass reinforcement layer. This minimal distance ensures the mechanical strength of the coupling.

Preferably, according to an embodiment of the invention, the turn-up end radially inward of the coupling point and radially nearest the coupling point is positioned, with respect to the radially innermost point of the bead core, at a radial distance less than or equal to 0.9 times the radial distance between the coupling point and the radially innermost point of the bead core. This feature avoids locating the ends of turn-ups radially inward of the coupling point, in the rim flexing area which can extend radially inward of the coupling point, and therefore cause deterioration of the polymeric compounds in the vicinity of these ends, which can cause deterioration of the tire.

It is also advantageous, according to an embodiment of the invention, to position the turn-up end radially inward of the coupling point and radially nearest the radially innermost point of the bead core at a radial distance with respect to the radially innermost point of the bead core, greater than or equal to the diameter of the circle circumscribed around a meridian section of the bead core. This feature ensures a minimum radial distance for the ends of all the turn-ups, which is necessary to ensure sufficient anchorage, either by coupling or by immobilization.

Preferably, according to an embodiment of the invention, the reinforcing elements of the carcass reinforcement layers are made of textile materials.

Advantageously, the reinforcing elements of the carcass reinforcement layers are of aromatic polyamide, aliphatic polyamide or hybrid type. Hybrid-type reinforcing elements are described for example in Patent EP 1 381 525, as reinforcing elements each including a plurality of filaments, at least one of the filaments having a different modulus of elasticity than that of at least one other of the filaments.

Preferably, according to an embodiment of the invention, a polymeric bead filler compound has a secant modulus of extension at 10% deformation greater than or equal to 3 MPa. A modulus of this order further improves the mechanical immobilizing of the turn-ups, decoupled from the other layers, on at least one face.

It is also advantageous, according to an embodiment of the invention, to have at least two polymeric bead filler compounds, at least one of which is adjacent to the bead core. Differing polymeric bead filler compounds enable the thermo-mechanical operation of the bead to be optimized.

Also advantageously, the secant modulus of extension at 10% deformation of the polymeric bead filler compound adjacent to and radially outward of the bead core is greater than or equal to the secant moduli of extension at 10% deformation of the other polymeric bead filler compounds. This approach staggers the stiffnesses, the greatest of which corresponds to the polymeric bead filler compound adjacent to and radially outward of the bead core.

DETAILED DESCRIPTION OF THE DRAWINGS

FIGS. 1 to 5 are not shown to scale.

Figure 1:
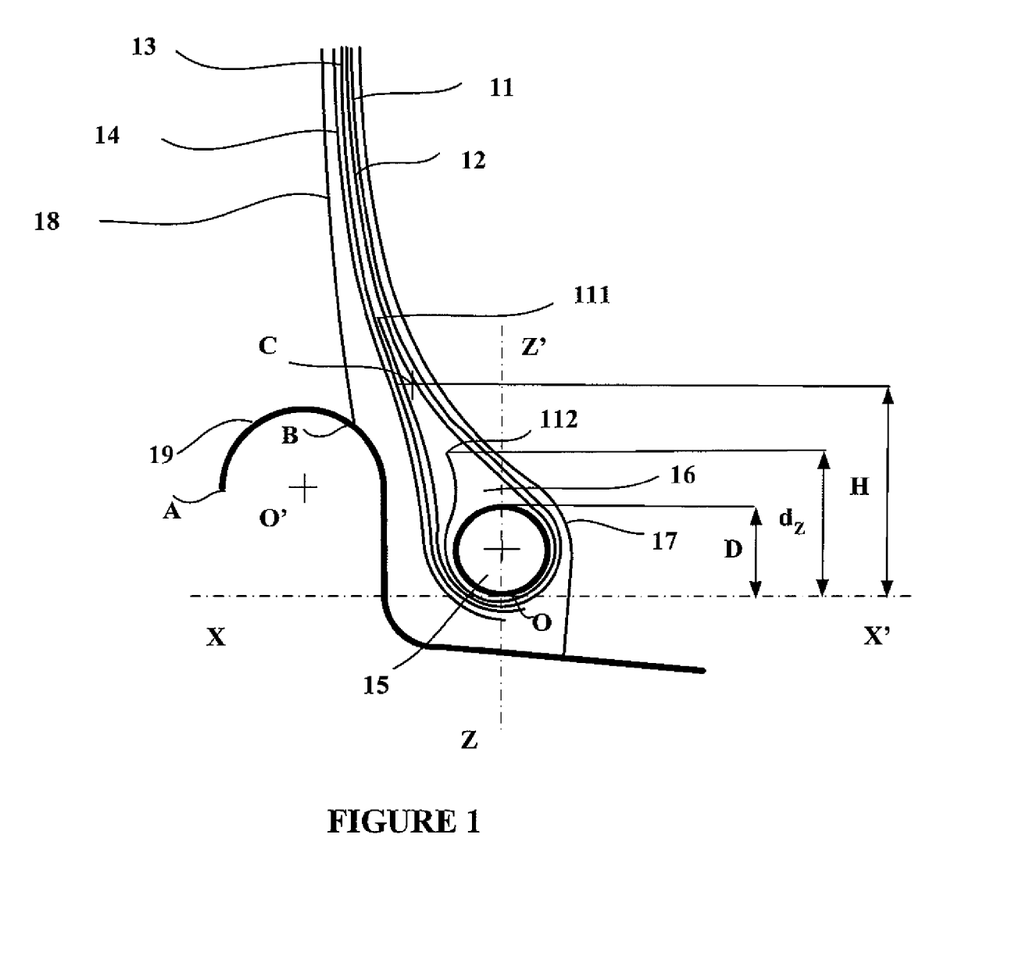
FIG. 1 is a meridian view of a diagram of part of a tire made in accordance with a first example of an embodiment of the invention.

FIG. 1 shows a diagram of part of a tire fitted to a wheel rim 19.

In FIG. 1 the bead 17 is connected to the tire tread (not shown) by a sidewall 18 and provides the connection between the tire and the wheel rim 19, the flange of which is a portion of a circle of centre O'.

At the rim flange, point A represents the axially outermost end of the rim flange, and point B the axially outermost point of contact between the tire and the rim flange, the tire being inflated to its nominal pressure.

The carcass reinforcement consists of two inner layers 11 and 12 wrapped around the bead core 15 in a direction proceeding from the inside to the outside of the tire and forming two turn-up ends 111 and 112, respectively; and two outer layers 13 and 14 wrapped around the bead core 15 in a direction proceeding from the outside to the inside of the tire.

The single polymeric bead filler compound 16 decouples the inner layer 12 axially nearest the bead core from its own turn-up end 112, and from the end 111 of the turn-up of the other inner layer 11.

The coupling point C is the radially outermost point of the polymeric bead filler compound 16, beyond which in the radial direction the turn-up end 111 and the layers 11, 12, 13 and 14 are each coupled to their neighbour. The radial distance between the coupling point C and the radially innermost point O on the bead core is denoted H and equal to 50 mm, i.e. the distance between point O and point B.

The diameter of the circle circumscribed around the meridian section of the bead core is denoted D and is equal to 21.5 mm, the bead core being sized to withstand an inflation pressure of four times the nominal pressure.

The end 111 of the layer 11 is radially outward of the coupling point C. The end 112 of the layer 12 is radially inward of the coupling point C. In this example the end 112 of the layer 12 is the only end radially inward of the coupling point C, so it is not only the nearest to point C but also the nearest to point O. The radial distance $d_z$ between the end 112 and the radially innermost point O on the bead core is equal to 38 mm. In accordance with the invention, this distance is greater than or equal to D, that is 21.5 mm, and less than or equal to 0.9 times H, that is 45 mm.

The turn-up of the inner layer 11 is coupled, on its face oriented axially outwards, to the outer layer 13 and coupled, on its face oriented axially inwards, to the outer layer 12. In accordance with the invention, the turn-up of the inner layer 12 is decoupled, on its axially outward face, from the axially nearest turn-up—that is, from the turn-up of the layer 11—by the polymeric bead filler compound 16.

The textile reinforcing elements of the carcass reinforcement layers are of hybrid type. The force at break of this kind of hybrid reinforcing element, measured on a reinforcing element taken from a new tire, is 104 daN.

The secant modulus of extension at 10% elongation of the polymeric bead filler compound 16 is equal to 25 MPa, and therefore greater than or equal to 3 MPa, in accordance with the invention.

Figure 2:
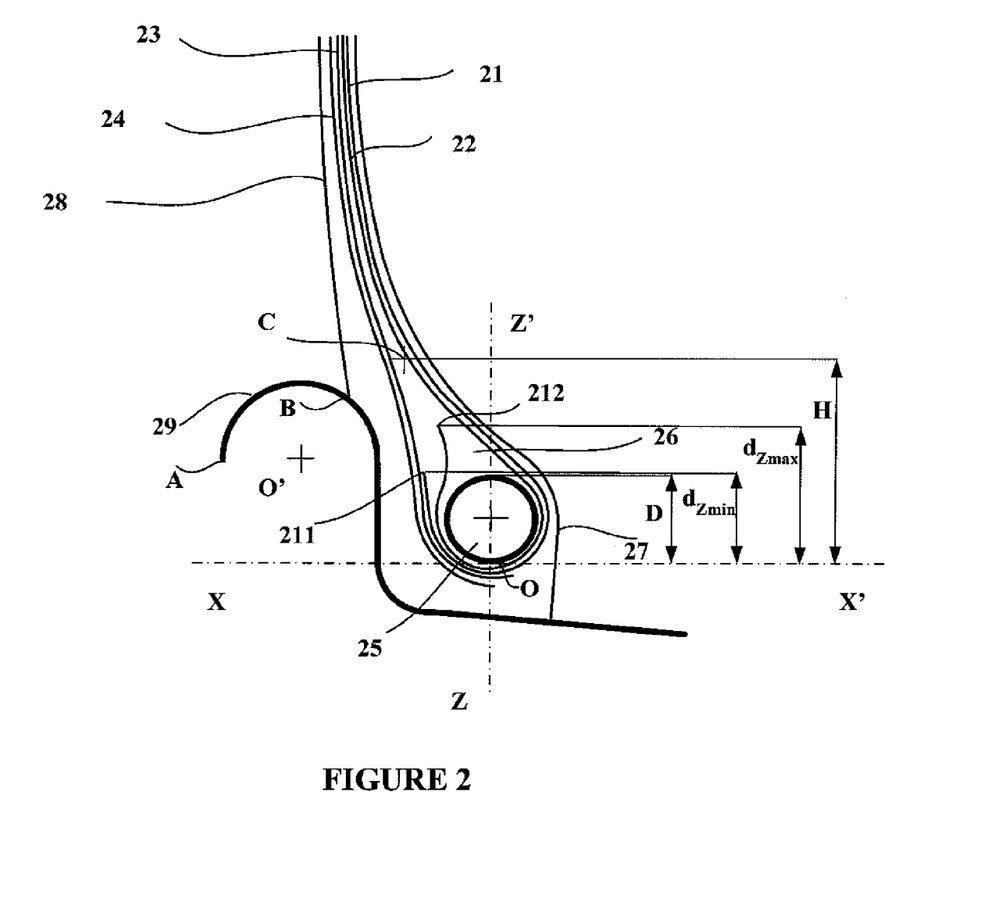
FIG. 2 is a meridian view of a diagram of part of a tire made in accordance with a second example of an embodiment of the invention.

The example in FIG. 2 differs from that in FIG. 1 only in the geometrical positioning of the turn-up ends 211 and 212 of the inner layers 21 and 22, the other features (the mechanical properties of the textile reinforcing elements and of the polymeric bead filler compound, the radial position of the coupling point C, and the diameter of the bead core) being identical. All the turn-up ends are radially inward of the coupling point C, and a turn-up is coupled, all the way along its length, to the axially innermost outer layer.

In FIG. 2, the end 211 of the axially innermost inner layer 21 is radially inward of the end 212 of the inner layer 22. In accordance with the invention, the turn-up of the inner layer 21 is coupled, on its axially outward face, to the outer layer 23, and decoupled, on its axially inward face, from the turn-up of the inner layer 22, by the polymeric bead filler compound 26.

The radial distance $d_{z\,max}$ of the end 212 is equal to 38 mm, and therefore less than or equal to 0.9 times H, that is 45 mm, in accordance with the invention.

The radial distance $d_{z\,min}$ of the end 211 is equal to 23 mm, and therefore greater than or equal to D, that is 21.5 mm, in accordance with the invention.

Figure 3:
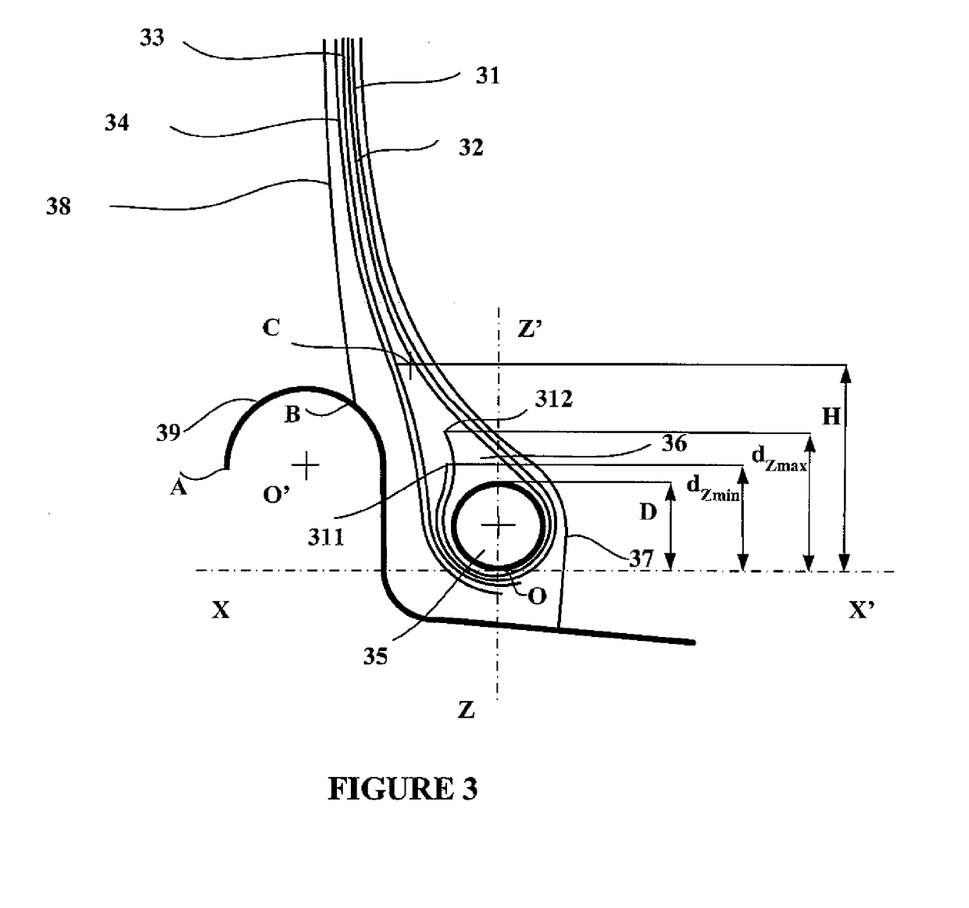
FIG. 3 is a meridian view of a diagram of part of a tire made in accordance with a third example of an embodiment of the invention.

The example in FIG. 3 differs from that in FIG. 1 only in the geometrical positioning of the turn-up ends 311 and 312 of the inner layers 31 and 32, the other features (the mechanical properties of the textile reinforcing elements and of the polymeric bead filler compound, the radial position of the coupling point C, and the diameter of the bead core) being identical. All the turn-up ends are radially inward of the coupling point C, the turn-ups are coupled to each other and decoupled from any other carcass reinforcement layer.

In FIG. 3, the end 311 of the axially innermost inner layer 31 is radially inward of the end 312 of the inner layer 32. In accordance with the invention, the turn-up of the inner layer 31 is decoupled, on its axially outward face, from the outer layer 33, by the polymeric bead filler compound 36, and coupled, on its axially inward face, to the turn-up of the inner layer 32.

The radial distance $d_{z\,max}$ of the end 312 is equal to 38 mm, and therefore less than or equal to 0.9 times H, that is 45 mm, in accordance with the invention.

The radial distance $d_{z\,min}$ of the end 311 is equal to 23 mm, and therefore greater than or equal to D, that is 21.5 mm, in accordance with the invention.

Figure 4:
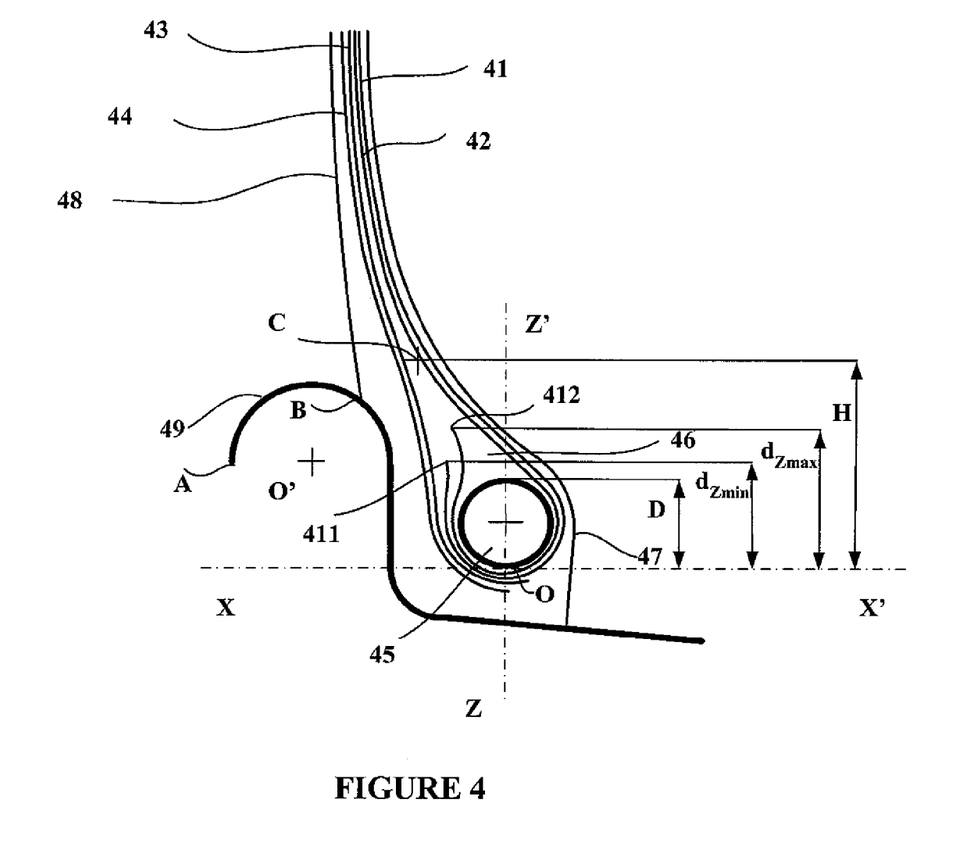
FIG. 4 is a meridian view of a diagram of part of a tire made in accordance with a fourth example of an embodiment of the invention.

The example in FIG. 4 differs from that in FIG. 1 only in the geometrical positioning of the turn-up ends 411 and 412 of the inner layers 41 and 42, the other features (the mechanical properties of the textile reinforcing elements and of the polymeric bead filler compound, the radial position of the coupling point C, and the diameter of the bead core) being identical. All the turn-up ends are radially inward of the coupling point C, the turn-ups are decoupled from each other and from any other carcass reinforcement layer.

In FIG. 4, the end 411 of the axially innermost inner layer 41 is radially inward of the end 412 of the inner layer 42. In accordance with the invention, the turn-up of the inner layer 41 is decoupled, on its axially outward face, from the outer layer 43, and decoupled on its axially inward face, from the turn-up of the inner layer 42. Both decouplings are provided by the polymeric bead filler compound 46.

The radial distance $d_{z\,max}$ of the end 412 is equal to 38 mm, and therefore less than or equal to 0.9 times H, that is 45 mm, in accordance with the invention.

The radial distance $d_{z\,min}$ of the end 411 is equal to 23 mm, and therefore greater than or equal to D, that is 21.5 mm, in accordance with the invention.

Figure 5:
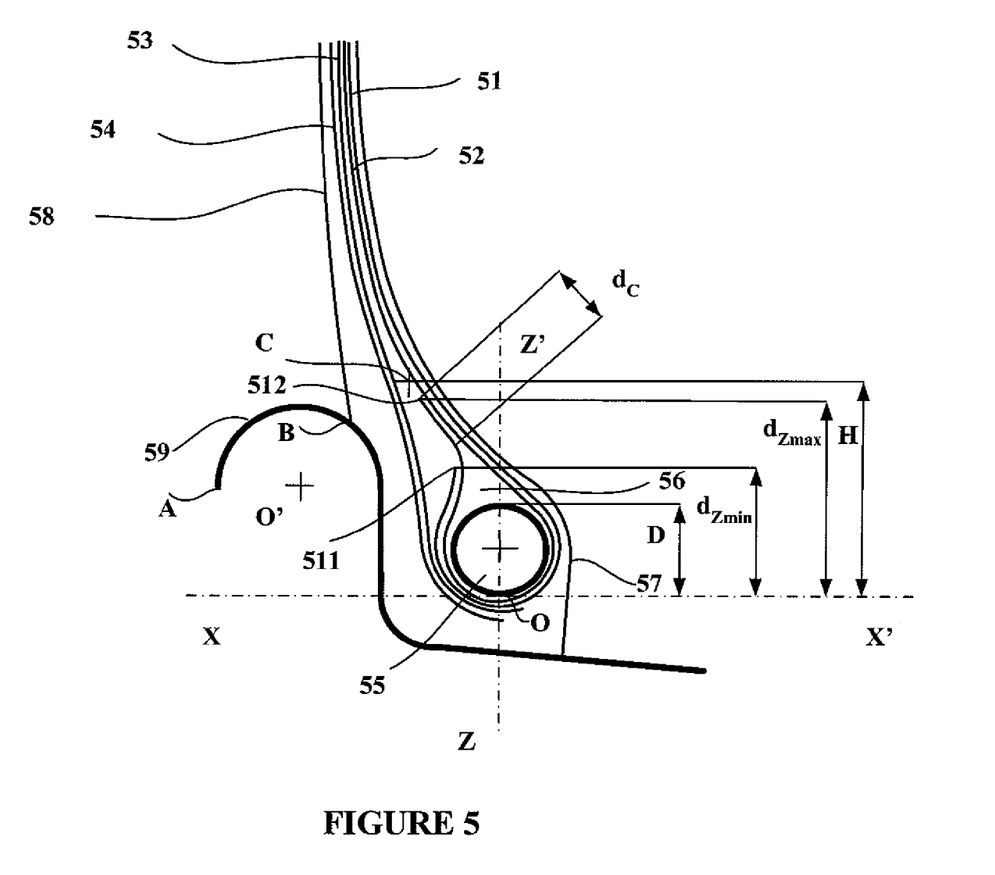
FIG. 5 is a meridian view of a diagram of part of a tire made in accordance with a fifth example of an embodiment of the invention.

The example in FIG. 5 differs from that in FIG. 1 only in the geometrical positioning of the turn-up ends 511 and 512 of the inner layers 51 and 52, the other features (the mechanical properties of the textile reinforcing elements and of the polymeric bead filler compound, the radial position of the coupling point C, and the diameter of the bead core) being identical. All the turn-up ends are radially inward of the coupling point C, the turn-ups are coupled to each other and one of them is coupled, at its end, to another carcass reinforcement layer.

In FIG. 5, the end 511 of the axially innermost inner layer 51 is radially inward of the end 512 of the inner layer 52. In accordance with the invention, the turn-up of the inner layer 51 is decoupled, on its axially outward face, from the outer layer 53, by the polymeric bead filler compound 56, and coupled, on its axially inward face, to the turn-up of the inner layer 52.

Given the particular features of this variant, the turn-up end 512 is coupled, in its end area, to the inner layer 52, for a distance $d_c$ equal to 15 mm, which is thus greater than or equal to 10 times the 1 mm diameter of the reinforcing element.

The radial distance $d_{z\,max}$ of the end 512 is equal to 45 mm, and therefore less than or equal to 0.9 times H, that is 45 mm, in accordance with the invention.

The radial distance $d_{z\,min}$ of the end 511 is equal to 30 mm, and therefore greater than or equal to D, that is 21.5 mm, in accordance with the invention.

Numerical simulations by finite elements performed on a model 1400×530 R 23 tire as shown in FIG. 3 have shown that the compression of the outermost layers which occurs in the rim flexing area of a reference tire as disclosed in Patent EP 1 381 525 was sharply reduced or even eliminated. Thus, the minimal deformation of the reinforcing element of the outer layer 34 axially nearest the rim flange, when calculated in the rim flexing area, moves from −1%, which is a compression elongation, in the case of the reference tire, to +0.1%, which is a traction elongation, in the case of the tire shown in FIG. 3. This principle of not moving into compression of the reinforcing elements of the axially outermost outer layer gives said reinforcing elements a more durable mechanical strength and therefore gives the tire greater longevity.

The invention should not be interpreted as being limited to the examples illustrated in the figures, but can be extended to other variants.

The invention can be extended in particular to tires in which the carcass reinforcement comprises either a single inner layer and a single outer layer, or more than two inner layers and more than two outer layers.

The invention can also be extended to tires in which the bead comprises at least two polymeric filler compounds.

Lastly, the invention can be extended to tires in which the constituent materials of the reinforcing elements of the reinforcement layers are, without implying any limitation, carbon, glass or the like.

The invention claimed is:

1. An airplane tire, having an inflation pressure greater than 9 bar and a deflection greater than 30%, comprising:
   a tread connected by two sidewalls to two beads, said two beads providing a connection between the tire and a wheel rim, and each of said two beads comprising a bead core, and a carcass reinforcement comprising at least two inner layers wrapped around said bead core in a direction proceeding from the inside to the outside of said tire to form respectively a turn-up terminating at an end, and at least one outer layer wrapped around said bead core in a direction proceeding from the outside to the inside of said tire, and axially outward, within said sidewall, of any inner layer, wherein one of said at least two inner layers that is axially nearest said bead core is decoupled for at least a part of its length, in an area adjacent to and radially outward of said bead core, from said turn-ups and carcass reinforcement layers which are axially outward of it, by at least one polymeric bead filler compound, the radially outermost point C of said at least one polymeric bead filler compound being termed a coupling point, wherein at least one turn-up of one of said at least two inner layers has an end radially outward of said coupling point and is coupled, for at least a part of its length and on both of its faces, to adjacent carcass reinforcement layers, wherein the end of at least one turn-up of said at least two inner layers is radially inward of said coupling point, and wherein said at least one turn-up, whose end is radially inward of the coupling point, is decoupled for at least a part of its length and on at least its axially outward face from any other carcass reinforcement layer or from any other turn-up by said at least one polymeric bead filler compound.

2. The tire according to claim 1, wherein the turn-up end radially inward of said coupling point and radially nearest said coupling point is positioned, with respect to the radially innermost point O of said bead core, at a radial distance $d_{2\,max}$ less than or equal to 0.9 times H, H being a radial distance between said coupling point and the radially innermost point O of said bead core.

3. The tire according to claim 1, wherein the turn-up end, radially inward of said coupling point and radially nearest the radially innermost point O of said bead core, is positioned, with respect to the radially innermost point O of said bead core, at a radial distance $d_{2\,min}$ greater than or equal to the diameter D of a circle circumscribed around a meridian section of said bead core.

4. The tire according to claim 1, wherein each of said inner and outer carcass reinforcement layers comprises reinforcing elements and the reinforcing elements of the carcass reinforcement layers are made of textile materials.

5. The tire according to claim 4, wherein the reinforcing elements of the carcass reinforcement layers are of aromatic polyamide, aliphatic polyamide or hybrid type.

6. The tire according to claim 1, wherein said at least one polymeric bead filler compound has a secant modulus of extension at 10% deformation greater than or equal to 3 MPa.

7. The tire according to claim 1, wherein said at least one polymeric bead filler compound includes at least two polymeric bead filler compounds, at least one of which is adjacent to said bead core.

8. The tire according to claim 7, wherein only one of said at least two polymeric bead filler compounds is adjacent to and radially outward of said bead core and secant modulus of extension at 10% deformation of said one polymeric bead filler compound adjacent to and radially outward of said bead core is greater than or equal to the secant moduli of extension at 10% deformation of the other polymeric bead filler compounds.

9. An airplane tire, having an inflation pressure greater than 9 bar and a deflection greater than 30%, comprising:
  a tread connected by two sidewalls to two beads, said two beads providing a connection between said tire and a wheel rim, and each of said two beads comprising a bead core, and
  a carcass reinforcement comprising at least two inner layers wrapped around said bead core in a direction proceeding from the inside to the outside of said tire to form respectively a turn-up terminating at an end, and at least one outer layer wrapped around said bead core in a direction proceeding from the outside to the inside of said tire, and axially outward, within said sidewall, of any inner layer,
wherein one of said at least two inner layers that is axially nearest said bead core is decoupled for at least a part of its length, in an area adjacent to and radially outward of said bead core, from said turn-ups and carcass reinforcement layers which are axially outward of it, by at least one polymeric bead filler compound, the radially outermost point C of said at least one polymeric bead filler compound being termed a coupling point,
wherein said at least one polymeric bead filler compound has a secant modulus of extension at 10% deformation greater than or equal to 3 MPa,
wherein the end of at least one turn-up of said at least two inner layers is radially inward of said coupling point, and
wherein said at least one turn-up, whose end is radially inward of the coupling point, is decoupled for at least a part of its length and on at least its axially outward face from any other carcass reinforcement layer or from any other turn-up by said at least one polymeric bead filler compound.

* * * * *